April 5, 1927.

E. R. BURTNETT 1,623,389

INTERNAL COMBUSTION ENGINE

Filed Oct. 23, 1924

INVENTOR,
E. R. BURTNETT.
BY Martin P. Smith ATTY.

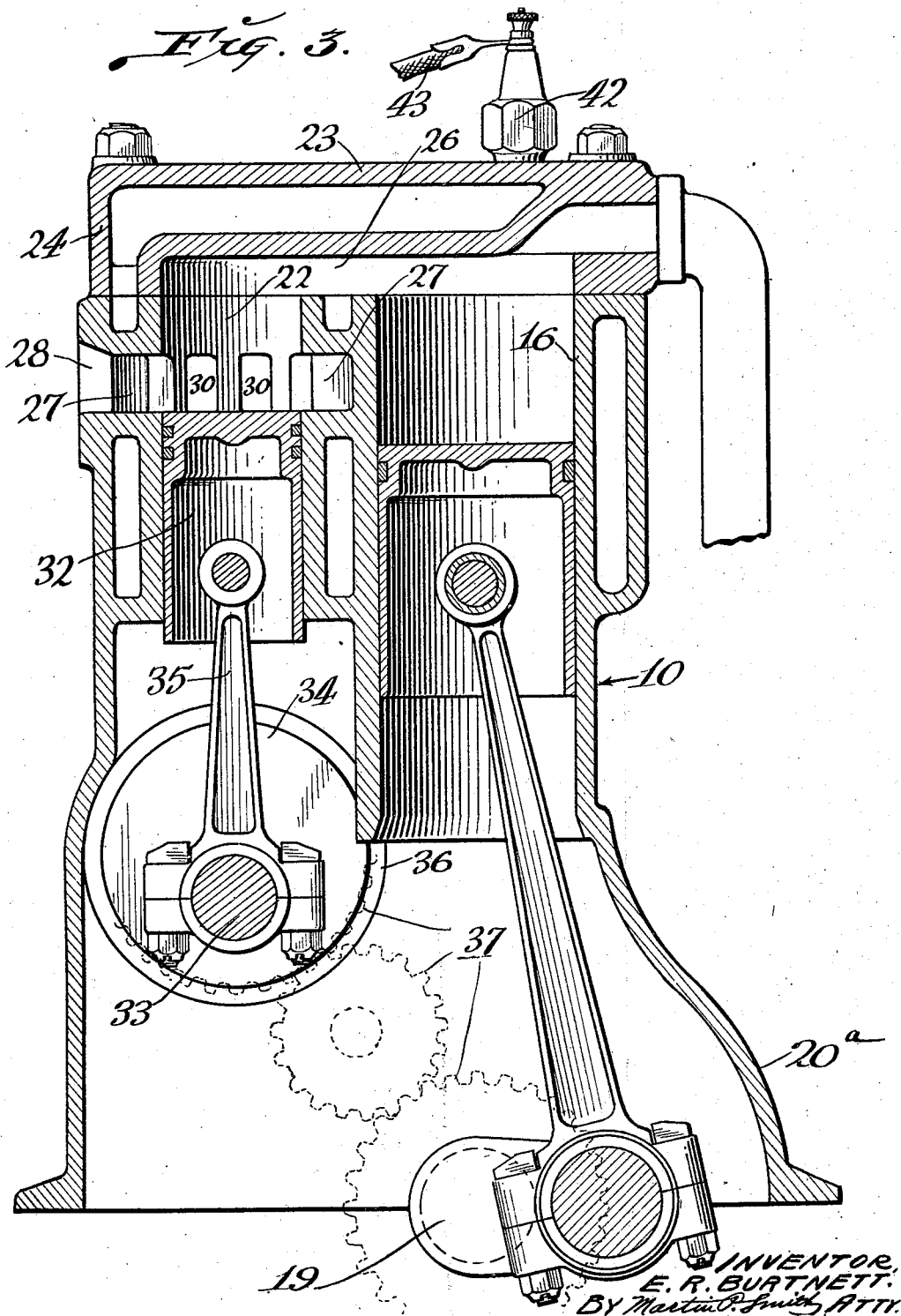

Patented Apr. 5, 1927.

1,623,389

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed October 23, 1924. Serial No. 745,341.

My invention relates generally to internal combustion engines that operate on the two stroke cycle principle, and more particularly to a valve structure that is particularly designed for a two stroke cycle internal combustion engine having gaseous fuel pumping cylinders, the principle object of my invention being to provide a relatively simple and practical valve structure that will be positively and mechanically actuated, easily constructed, assembled and installed, readily accessible for the purpose of inspection, adjustments or repairs, and practically silent in operation.

Further objects of my invention are to arrange the valve structure laterally and immediately adjacent to the pumping cylinders of an engine so that the clearance chambers joining the pump cylinders and the respective piston valve cylinders will be as short as possible in order to eliminate condensation of the fuel mixture; further to provide a piston valve structure that will be arranged immediately adjacent and directly connected to the driving mechanism and the piston valve actuating shaft having an extension on the opposite end to the end to which the driving mechanism is connected, for the arrangement of the generator connection, thus making it possible to readily remove the generator without interfering with the piston valve timing in relation to the engine shaft.

With the foregoing and other objects in view, my invention consists in the novel features of construction and arrangement of parts which will be hereinafter described and claimed, reference being had to the accompanying drawings, in which—

Fig. 3 is an enlarged vertical transverse section taken on the line 3—3 of Fig. 2.

Figure 1:
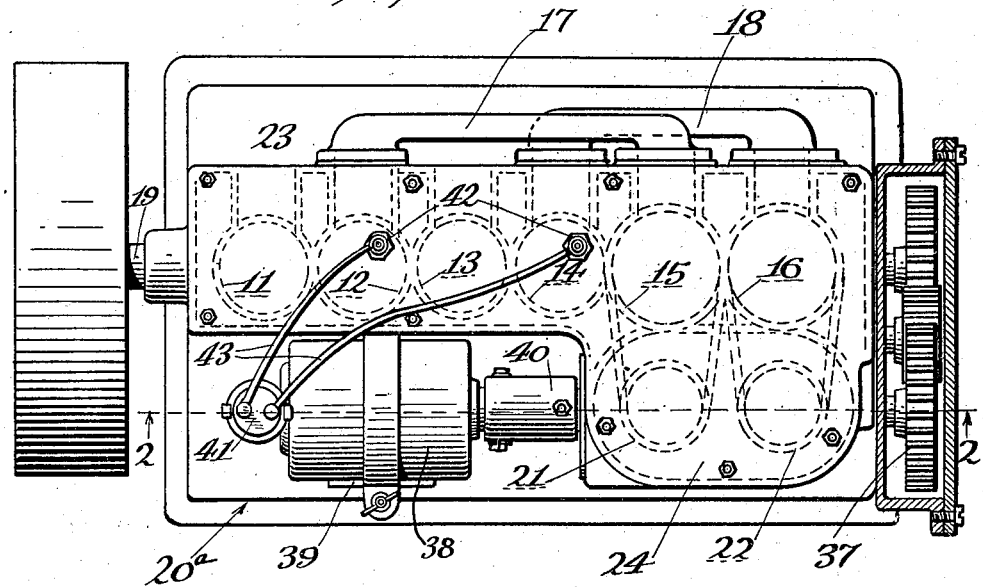
Fig. 1 is a top plan view of an internal combustion engine constructed in accordance with my invention.
Figure 2:
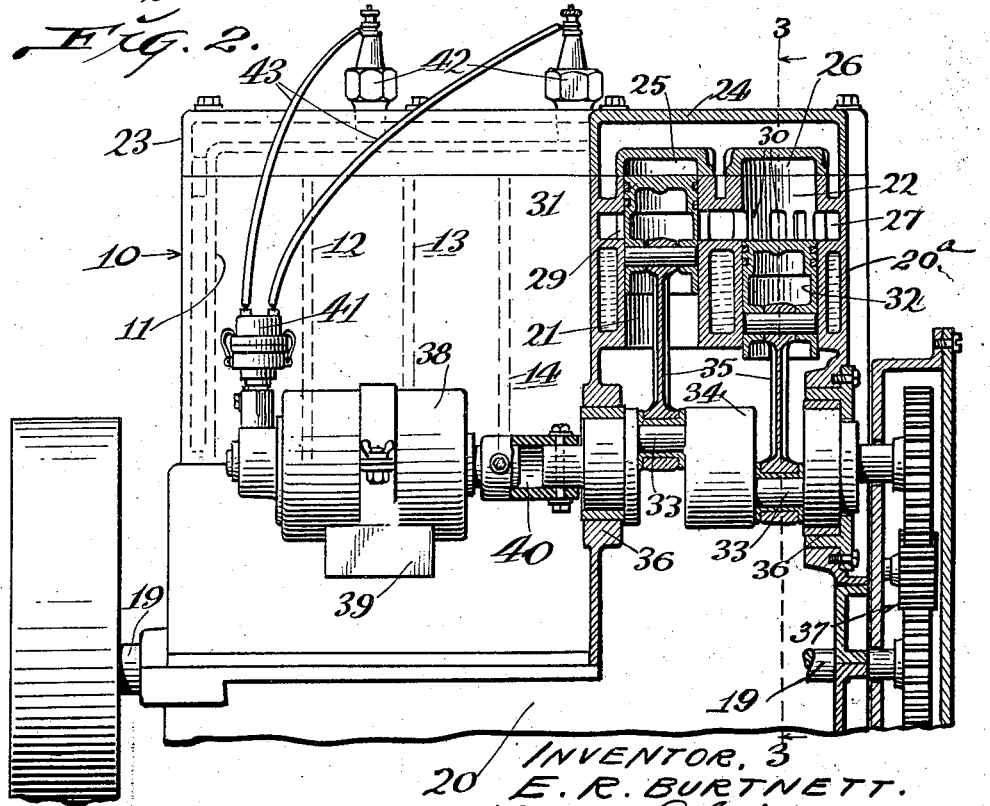
Fig. 2 is a vertical section taken approximately on the line 2—2 of Fig. 1.

Referring by numerals to the accompanying drawings which illustrate a practical embodiment of my invention, 10 designates a cylinder block in which are formed four combustion chambers 11, 12, 13 and 14 and a pair of pumping chambers 15 and 16. These chambers are disposed in a row, with their axes parallel, and the four combustion chambers are arranged in pairs, with the head ends of chambers 11 and 12 connected by a common clearance space and the head ends of chambers 13 and 14 connected by a common clearance space. Gaseous fuel from pumping chamber 15 passes through an externally arranged transfer duct 17 to inlet ports leading into the combustion chamber 12 of the connected pair of combustion chambers 11 and 12, and gaseous fuel is pumped from chamber 16 through a transfer duct 18 to combustion chamber 14 of the pair of connected combustion chambers 13 and 14.

Suitable pistons are arranged for operation within all of the combustion and pumping chambers, said pistons being suitably connected to the cranks or throws of a crank shaft 19, and the latter being mounted for rotation in suitable bearings that are formed at the ends and within a crank case 20$^a$, which latter is disposed below and connected to block 10. Formed integral with the side of block 10 and immediately adjacent to the pumping cylinders 15 and 16 is a piston valve chamber block 20, and formed therein are piston valve chambers 21 and 22. Valve chamber 21 is in transverse alinement with pumping chamber 15 and valve chamber 22 is in transverse alinement with pumping chamber 16. A head block 23 is secured in position on top of cylinder block 10 and closes the combustion and pumping chambers therein and extending laterally from the sides of this block at one end is an extension 24 that serves as a head block for the piston valve cylinder block 20. The head or inner end of valve chamber 21 is connected to the head or inner end of pumping chamber 15 by a transversely disposed clearance space 25 that is formed in the under side of block 24 and its extension 24 and a corresponding duct or clearance space 26 that is formed in the under side of block 23 and extension 24 connects the head or upper end of pumping chamber 16 with the corresponding end of valve chamber 22.

Formed in the wall of block 20 around the upper portions of the valve chambers 21 and 22 therein are connected annular chambers 27, and leading to said chambers are gaseous fuel inlet ports, such as 28, that may be connected to a suitable source of gaseous fuel supply, for instance, a carburetor. Leading from the annular chamber 27 that surrounds pumping chamber 21 into the upper portion of said pumping chamber are gaseous fuel inlet ports 29 and corresponding inlet ports 30 lead from the annular chamber 27 that surrounds chamber 22 into the upper portion of said last mentioned chamber. Arranged for reciprocatory movement within valve chambers 21 and 22 are respectively piston valves 31 and 32, and connecting said pistons to the cranks or throws 33 of a valve crank shaft 34 are connecting rods such as 35. Crank shaft 34 is journaled for rotation in suitable bearings 36 that are arranged beneath block 20, and this valve crank shaft is driven in any suitable manner, preferably by means of a train of gearing such as 37, directly from crank shaft 19 of the engine, said gearing or driving means being arranged so that said valve crank shaft 34 operates at the same speed as said crank shaft 19.

Block 20 provides a lateral extension at one end of the engine cylinder block 10, and for convenience and in order to produce a compact structure the generator 38 that is associated with the engine is mounted on a suitable support 39 directly behind the lower portion of block 20, and thus said generator is positioned so that it may be driven directly from the piston valve actuating crank shaft 34. The generator shaft is directly connected to the piston valve crank shaft 34 in any suitable manner, but preferably by a flexible tubular connection, such as 40. Associated with the generator is an ordinary timing apparatus 41, and connecting said timer with spark plugs 42 that are located in head 23 above combustion chambers 12 and 14 are suitable conductors 43.

It will be understood that pistons 31 and 32 that are reciprocated from cranks 33 of crank shaft 34 control the admission of gaseous fuel from the connected chambers 27 through inlet ports 29 and 30 into the piston chambers 21 and 22, for when either crank 33 is at top center the piston valve connected thereto is at the upper end of its stroke, thereby closing the corresponding inlet valves, and when either crank is at low center the connected piston valve is at the lower end of its stroke, thereby uncovering and opening the corresponding gaseous fuel inlet valves. The gaseous fuel charges admitted to the piston valve chambers 21 and 22 while the ports 29 and 30 are open pass through ducts or clearance spaces 25 and 26 into pumping chambers 15 and 16, and from the last mentioned chambers the gaseous fuel charges are pumped through the transfer ducts 17 and 18 to the combustion chambers 12 and 14, respectively.

Inasmuch as the piston valve crank shaft 34 operates at engine speed or at the same speed with crank shaft 19, the piston valves 31 and 32 will be actuated in proper time relation to the movements of the pumping pistons that operate within chambers 15 and 16.

The lateral extension or block 20 being disposed at one end of the cylinder block 10 provides a convenient arrangement whereby the generator may be located in the space or offset immediately behind the piston valve block and, as a result, a very compact structure is produced and the generator and timer are located where they are readily accessible for inspection, adjustment or repairs.

That portion of piston valve cylinder block 20 that extends downwardly to provide a crank case or housing for the piston valve operating crank shaft 34 is open at its lower end, and said lower end communicates directly with the upper portion of crank case 20, and as a result the oil throw from the pumping piston connecting rods will splash upwardly into the piston valve mechanism, thereby effectively lubricating the same.

Obviously, the construction of the engine as herein shown and described may be changed and modified in certain details without departing from the spirit of my invention, the scope of which is set forth in the appended claims.

I claim as my invention:

1. The combination in a two stroke cycle internal combustion engine, of a series of six cylinders arranged in a row, two of the cylinders at one end of the row functioning as pumping cylinders, the other four cylinders functioning as combustion cylinders and being arranged in pairs with the head ends of the members of each pair connected by a common clearance, compression and combustion space, piston valve cylinders arranged laterally with relation to said pumping cylinders, piston valves arranged for operation within said piston valve cylinders for controlling the admission of gaseous fuel into said piston valve cylinders, a piston valve crank shaft, means connected to one end of said shaft for driving same at engine crank shaft speed, the other end of said shaft being extended to provide a point of attachment for an engine accessory, and the lower portions of the piston valve cylinders being in direct communication with the interior of the engine crank case, whereby the piston valves and their operating mechanism are lubricated from the oil splash within said crank case.

2. The combination, in a two stroke cycle internal combustion engine, of a series of six cylinders arranged in a row, two of the cylinders at one end of the row functioning as pumping cylinders, the other four cylinders functioning as combustion cylinders and being arranged in pairs with the head ends of the members of each pair connected by a common clearance, compression and combustion space, a transfer duct leading from the first pumping cylinder at the end of the row to the third cylinder in the row, which latter cylinder, with the fourth cylinder in the row constitutes the first pair of combustion cylinders in the row from the end in which the pumping cylinders are located, a transfer duct leading from the second pumping cylinder from the end of the row of cylinders, to the fifth cylinder in the row, which latter cylinder with the sixth cylinder in the row, constitutes the second pair of combustion cylinders in the row from the end in which the pair of pumping cylinders are located, piston valve cylinders arranged with relation to said pumping cylinders, piston valves arranged for operation within said piston valve cylinders for controlling the admission of gaseous fuel into said piston valve cylinders, a piston valve crankshaft, means connected to one end of said shaft for driving same at engine crank shaft speed, the other end of said shaft being extended to provide a point of attachment for an engine accessory, and the lower portions of the piston valve cylinders being in direct communication with the interior of the engine crank case, whereby the piston valves and their operating mechanism are lubricated from the oil splash within said crank case.

In testimony whereof I affix my signature.

EVERETT R. BURTNETT.